Oct. 24, 1961  F. H. MÜLLER  3,005,552
PROCESS AND APPARATUS FOR DEMIXING SUBSTANCES
Filed Aug. 1, 1956

INVENTOR.
F. HORST MÜLLER
BY
Burgess, Dinklage & Sprung
ATTORNEY 3,005,552
PROCESS AND APPARATUS FOR
DEMIXING SUBSTANCES
Friedrich Horst Muller, Marburg an der Lahn, Germany, assignor to Farbenfabriken Bayer Aktiengesellschaft, Leverkusen, Germany, a corporation of Germany
Filed Aug. 1, 1956, Ser. No. 602,485
Claims priority, application Germany Aug. 3, 1955
5 Claims. (Cl. 210—73)

The invention relates to a process and apparatus for demixing substances, more especially gas or liquid mixtures, but also colloidal mixtures and suspensions, solutions and melts. The process according to the invention consists in that the substances are introduced into at least one narrow conduit, preferably a capillary tube, and are conveyed through the said capillary tube in a laminar flow, and that the stream is divided at the outlet end of the capillary tube into a central stream and a peripheral stream, each component stream being taken off separately.

The process is based on the discovery that with a Poiseuille flow in a capillary tube (laminar flow), demixing can take place if the flowing matter is a mixture, solution or melt.

The demixing effect is dependent on the rate of change of viscosity with concentration, and on the diffusion coefficient, the mean flow velocity and the radius of the capillary tube. In particular, noticeable effects are to be expected with differences in magnitude in the viscosity values of the pure components.

For example, when a mixture of nitrogen and hydrogen in a rate of 50:50 flows through a capillary tube of 150 cm. in length and 2 mm. internal diameter at a mean velocity of 25 cm./sec., it has been established that about 0.3% more hydrogen is contained in the peripheral zone of the capillary tube at the outlet from the latter than in the mixture entering the inlet end of the capillary tube. Sugar solutions and glycerine-water mixtures have experimentally produced demixing effects of the same order of magnitude. The substances to be demixed can be conveyed from a storage vessel directly into the capillary tube, or they can be mixed from components by means of a suitable mixing means or in a mixing chamber prior to entering the capillary tube. In order to obtain a step-by-step increase in the demixing of the substances, the component streams which are actually taken off at the end of the capillary tubes can be delivered as part of the charge to an adjacent capillary tube, and so on.

In order to increase the separation effect, substances can be demixed by means of a series of demixing units each unit consisting of a mixing chamber connected by a capillary tube to a dividing means for taking off separately the central and peripheral streams issuing from the capillary tube the central stream take-off means in each unit, save the first, communicating with the mixing chamber of the succeeding unit of the series, the peripheral stream take-off means in each unit, save the last, communicating with the mixing chamber of the preceding unit of the series, the substances being fed to the mixing chamber of an intermediate unit of the series, a part of the central stream component of the substance being withdrawn from the central stream take-off means of the first unit of the series the remainder being returned to the mixing chamber of the same unit, part of the peripheral stream component being withdrawn from the peripheral stream take-off means of the last unit of the series the remainder being returned to the mixing chamber of the same unit.

The introduction of the component streams (central stream on the one hand and peripheral stream on the other hand) into the mixing chambers preceding the capillary tubes and the take off of the component streams from the capillary tubes is continuously carried out.

The apparatus for carrying the process of the invention into effect comprises a mixing chamber connected by a capillary tube to a dividing means for taking off separately the central and peripheral streams issuing from the capillary tube and delivery means arranged in the take-off means.

The apparatus used for increasing the demixing effect on the substances comprises a series of demixing units; each unit consisting of a mixing chamber connected by a capillary tube to a dividing means for taking off separately the central and peripheral streams issuing from the capillary tube, the central stream take-off means in each unit, save the first, communicating with the mixing chamber of the succeeding unit of the series, the peripheral stream take-off means in each unit, save the last, communicating with the mixing chamber of the preceding unit of the series, a supply pipe for introducing the substance to be demixed into the mixing chamber of an intermediate member of the series, and recycle means connecting the central stream take-off means of the first unit with the mixing chamber of the same unit and recycle means connecting the peripheral stream take-off means of the last unit with the mixing chamber of this last unit. The first and last unit being provided with tapping points for withdrawing the central and peripheral streams respectively.

Constructional examples of the apparatus for carrying the process into effect are shown diagrammatically in the accompanying drawings in which.

Figure 1:
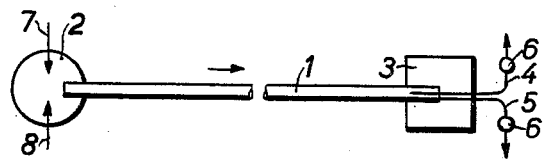
FIGURE 1 shows an individual separating unit, consisting of mixing chamber, capillary tube and dividing means.

The individual separating unit consists of a capillary tube 1, a mixing chamber 2 and a dividing means 3. The latter permits the laminar stream flowing through the capillary tube 1 in the direction of the arrow to be split up into a central stream and a peripheral stream. The central stream is taken off through the pipe 4 and the peripheral stream through the pipe 5. Connected with both the two take-off pipes 4 and 5 are delivery pumps 6, preferably gear-wheel pumps, which permit an accurate regulation of the fractions taken off (controlled-feed pumps). However, it is sufficient if a pump is connected into only one of the two pipes, preferably into the pipe for the peripheral zone, if provision is made for an inlet at the start of the capillary tube. At the inlet end of the capillary tube, the substance to be demixed is introduced into the chamber 2. The substance is either available from the outset as a mixture, for example as a solution or melt, or individual components of the substance are introduced into the chamber 2, and indicated by way of example in FIGURE 1 by the arrows 7 and 8. The mixture can also be first produced from the components, for example gases, at this point of inlet into the capillary tube by means of a suitable mixing valve. The connection of a separate mixing chamber is only necessary when a plurality of capillary tubes are assembled together and consequently the streams from the two juxtaposed chambers must be introduced, if necessary with the mixture flowing in.

The term "capillary tube" does not in any way represent a limitation to extraordinarily small diameters. When demixing gases and/or using high flow velocities, the capillary tubes can be relatively long and of a relatively large diameter, while they are preferably to be long and narrow when demixing liquid. The length of the capillary tube is dependent on the diffusion constant of the substances and should be chosen to ensure that an equilibrium is produced during the period of flow.

Figure 2:
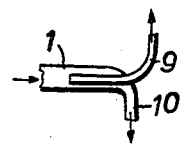
FIGURE 2 is a dividing means for separating component streams.
Figure 2A:
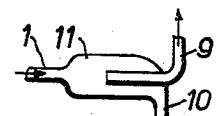
FIGURES 2a and 2b show modified constructional forms of such a dividing means.
Figure 2B:
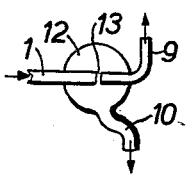

FIGURE 2 shows one embodiment of the dividing means 3, which is designed for example as a very thin tube 9 of particularly small wall thickness projecting inside and along the axis of the capillary tube 1. The central stream of the flow in the capillary tube is taken off through the pipe 9, while the peripheral stream thereof is taken off through the pipe 10. The capillary tube 1 is preferably wider in diameter at its end, as shown in FIGURE 2a (11). Another embodiment of the dividing means is shown is FIGURE 2b. In this example, the capillary tube 1 and the take-off pipe 9 are separated from one another by a gap 13. The take-off is effected through the said gap 13. It is important that on the basis of the knowledge concerning the formation of turbulence, care is taken that there is no change of the laminar flow into turbulent flow before the two component streams are separated.

Figure 3:
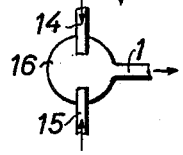
FIGURE 3 represents a mixing chamber.

FIGURE 3 shows one possible embodiment of a mixing chamber connected to a capillary tube, this chamber having proved satisfactory with gas mixtures. The two gas components flow from two nozzles 14 and 15 which are disposed facing one another and are whirled in the storage container 16 to form a homogeneous mixture, which then flows into the capillary tube 1.

Figure 4:
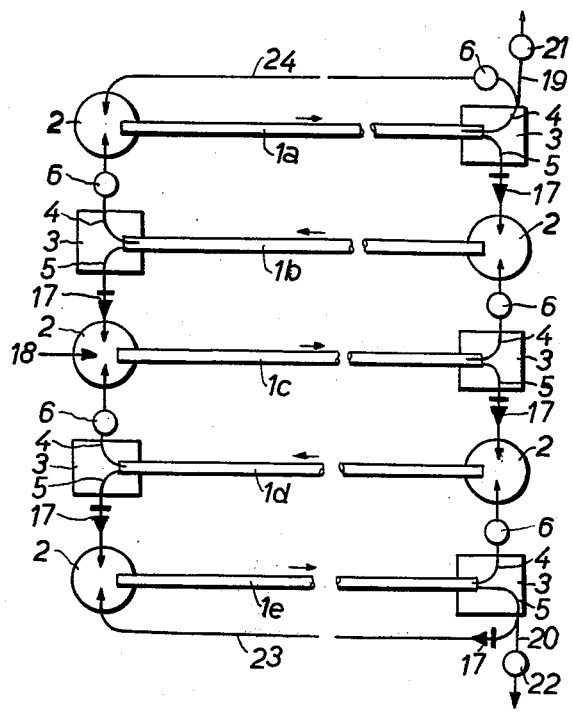
FIGURE 4 shows an assembly of a series of separating units which are arranged in parallel to one another.

FIGURE 4 shows a separating installation which is built up of a series of five separate units as described with reference to FIGURE 1. The capillary tubes bear the references 1a, 1b, 1c, 1d and 1e. The separate elements are arranged parallel to one another, and in each case the mixing chamber 2 of one capillary tube is opposite the take-off chamber 3 of the adjacent capillary tube. The central stream take-off pipes 4 and the peripheral stream take-off pipes 5 are in principle connected in such manner that the central stream take-off pipes 4 always open into the mixing chamber 2 of the next succeeding unit and the peripheral stream take-off pipes 5 always open into the mixing chamber 2 of the preceding unit. In this way, it is always the central stream 4 taken off from the preceding unit and the peripheral stream 5 returned from the next succeeding unit which flow together into the mixing chamber 2 of any one unit. The first and last units of the series, having capillary tubes 1a and 1e, form exceptions. As regards the last unit, having tube 1e, the peripheral stream is returned through the pipe 23 into the mixing chamber of this same unit, while as regards the first unit, having the tube 1a, the central stream is returned through the pipe 24 into the mixing chamber 2 of the first unit.

The substance to be demixed is introduced at 18 into the mixing chamber of the central unit of the series. Since it is readily possible for any desired number of the individual separating elements according to FIGURE 1 to be assembled into a separating installation of the type described, the recycling of the central and peripheral streams can be repeated as often as desired.

Using such a closed system, in which if necessary some of the delivery pumps 6 according to FIG. 4 can be replaced by non-return valves 17, so that the necessary direction of flow of the cycles is guaranteed, it is possible in the course of time to concentrate the two different components of the gas or liquid mixture, or of the solution or melt, introduced at 18, until an equilibrium is reached at the first and last units of the series. By using a sufficiently large number of individual units in the manner described, the concentration of the corresponding component streams can take place until the mixture introduced at 18 is separated substantially wholly into its components. The capillary tubes, which are illustrated as being straight, can also be coiled in spiral form for space reasons.

In order to produce a continuous separation the series of demixing units are filled, at an inlet 18 with the substance to be demixed, the inlet is closed and the substance cycled through the system until an equilibrium between the components is reached at which point the inlet is opened and further substance is continuously fed into the system while at the take-off means on the first and last units of the series, the same amount of the separated components is also continuously taken off from the central and the peripheral streams respectively. The component concentrated in the central stream is discharged from the pipe 19 by means of the pump 21 and the component concentrated in the peripheral zone is discharged from the pipe 20 by means of the pump 22.

Streams supplied at 18 and discharged at 19 or 20 must only be a fraction of those amounts which are constantly circulating in the individual cycles, so that the separation effect remains high. Accordingly, the withdrawal of the components is expediently regulated by pumps 21 and 22, which take off a fraction of the amount circulating, while the introduction at 18 is effected with excess pressure. Moreover, it is also possible to install delivery pumps in place of the non-return valves 17, if provision is made for the delivery outputs to be so adapted to one another that the supply and discharge remains the same at all parts of the system and no compression is set up at any place in the system.

I claim:

1. A process for demixing substances by the differences in magnitude in the viscosity values of the pure components which comprises introducing the substance to be demixed into the intermediate capillary conduit of a series of connected narrow capillary conduits, conveying the said substance through said capillary conduit in a laminar flow, dividing the flow at the outlet end of said capillary conduit into a central stream and a peripheral stream, removing the central stream and mixing the same in a mixing zone with the peripheral stream separated from the next succeeding conduit, passing the mixture through a second capillary conduit, dividing the flow at the outlet end of said second capillary conduit into a central stream and a peripheral stream, removing the central stream and mixing the same in a second mixing zone with the peripheral stream separated from the next succeeding conduit, repeating the said conveying, dividing and separating sequence at least one more time, thereafter taking off a portion of the central stream from the last conduit in the series, returning the remainder to the mixing zone of the same conduit, removing the peripheral stream separated from said intermediate conduit and mixing the same in a mixing zone with the central stream separated from the preceding conduit, passing the mixture through a second capillary conduit, dividing the flow at the outlet end of said second capillary conduit into a central stream and a peripheral stream, removing the peripheral stream and mixing the same in a second mixing zone with the stream separated from the next preceding conduit, repeating the said conveying, dividing and separating sequence at least one more time and taking off a part of the peripheral stream from the first conduit in the series, returning the remainder to the mixing unit of the same conduit of the series.

2. An apparatus for demixing substances comprising a series of demixing units, each unit consisting of a mixing chamber connected by a capillary conduit to a dividing means for taking off separately the central and peripheral streams issuing from the capillary conduit, the central stream take-off means in each unit, save the first, communicating with the mixing chamber of the succeeding unit of the series, the peripheral stream take-off means in each unit, save the last, communicating with the mixing chamber of the preceding unit of the series, and tapping points for withdrawing the central stream component from the first unit of the series and the peripheral stream component from the last unit of the series.

3. An apparatus as claimed in claim 2, wherein the supply pipe for the substance to be demixed is connected to the mixing chamber of an intermediate unit of the series.

4. An apparatus as claimed in claim 3, wherein the central stream take-off means of the first unit of the series is connected to the same mixing chamber of the unit and the peripheral stream take-off means of the last unit of the series is connected to the mixing chamber of the said last unit.

5. An apparatus as claimed in claim 3, wherein the demixing units are connected in parallel in such manner that the mixing chamber of one unit is always adjacent the dividing means of one of the other capillary tubes.

References Cited in the file of this patent

UNITED STATES PATENTS

| | | |
|---|---|---|
| 2,459,483 | Zimmer et al. | Jan. 18, 1949 |
| 2,688,869 | Sommer | Sept. 14, 1954 |
| 2,723,759 | Scovill | Nov. 15, 1955 |
| 2,737,297 | Gardner | Mar. 6, 1956 |